United States Patent
Dunkmann et al.

(10) Patent No.: US 7,677,622 B2
(45) Date of Patent: Mar. 16, 2010

(54) METHOD FOR OPERATING A VACUUM HANDLING DEVICE

(75) Inventors: Walter Dunkmann, Altensteig (DE); Gernot Schmierer, Munich (DE)

(73) Assignee: J. Schmalz GmbH, Glatten (DE)

( * ) Notice: Subject to any disclaimer, the term of this patent is extended or adjusted under 35 U.S.C. 154(b) by 439 days.

(21) Appl. No.: 11/660,604

(22) PCT Filed: Jul. 22, 2005

(86) PCT No.: PCT/EP2005/008011

§ 371 (c)(1),
(2), (4) Date: Feb. 20, 2007

(87) PCT Pub. No.: WO2006/024347

PCT Pub. Date: Mar. 9, 2006

(65) Prior Publication Data

US 2007/0255447 A1 Nov. 1, 2007

(30) Foreign Application Priority Data

Aug. 28, 2004 (DE) ........................ 10 2004 042 825

(51) Int. Cl.
*B25J 15/06* (2006.01)
*B25J 13/08* (2006.01)
(52) U.S. Cl. ................... 294/65; 294/64.1; 294/907
(58) Field of Classification Search ............. 294/64.1, 294/65, 907; 901/40, 46; 414/627, 737; 269/21

See application file for complete search history.

(56) References Cited

U.S. PATENT DOCUMENTS

| | | | |
|---|---|---|---|
| 4,252,497 A | | 2/1981 | Burt |
| 4,750,768 A | * | 6/1988 | Kumar ..................... 294/64.1 |
| 5,125,706 A | * | 6/1992 | Kuwaki et al. ............... 294/65 |
| 5,201,560 A | | 4/1993 | Golden |
| 5,475,619 A | * | 12/1995 | Sugano et al. .............. 700/301 |
| 5,609,377 A | * | 3/1997 | Tanaka ....................... 294/65 |
| 5,961,169 A | * | 10/1999 | Kalenian et al. ........... 294/64.1 |
| 6,641,131 B2 | * | 11/2003 | Stohr et al. .................. 271/91 |
| 6,817,639 B2 | * | 11/2004 | Schmalz et al. ............ 294/64.1 |

FOREIGN PATENT DOCUMENTS

DE 101 40 248 3/2003
DE 101 51 883 5/2003

* cited by examiner

*Primary Examiner*—Dean J Kramer
(74) *Attorney, Agent, or Firm*—Paul Vincent

(57) ABSTRACT

A method is proposed for operating a vacuum handling device controlled by a programmable controller (39) which can be connected to a machine controller (10), with at least one vacuum generator (28) and with a number of gripper modules (20), which are connected to the vacuum generator and are each equipped with a first pressure sensor (46) and with a control valve (44) for the vacuum in the gripper module, and which are connected to the programmable controller. The control valve in the gripper module is closed in a first switching state (vacuum on) of the programmable controller and is detected up to the control valve (44) by means of a second pressure sensor (78) in the vacuum generator.

20 Claims, 4 Drawing Sheets

METHOD FOR OPERATING A VACUUM HANDLING DEVICE

This application is the national stage of PCT/EP2005/008011 filed on Jul. 22, 2005 and also claims Paris Convention priority of DE 10 2004 042 825.5 filed on Aug. 28, 2004.

BACKGROUND OF THE INVENTION

The invention concerns a method for operating a handling device Controlled by a programmable controller which can be connected to a Machine controller, with at least one vacuum generator and with a Number of gripper modules which are connected to the vacuum generator, Which are each equipped with a first pressure sensor and a control valve For the vacuum in the gripper module, and which are connected to the Programmable controller.

A vacuum handling device generally consists of a vacuum generator, valve technology for controlling the vacuum, sensor technology for monitoring the vacuum, and at least one pneumatic gripper module. Systems of this type are used both for manual handling of unit loads and in automation technology.

Especially in automation technology, each gripper module of flat grippers having several gripper modules is separately controlled via a central control and regulation means. This involves great effort for linking the components and is also highly susceptible to errors.

The construction costs of this vacuum handling device mainly depend on the choice of vacuum generator. In order to limit these costs, one vacuum generator supplies several gripper modules.

DE 101 40 248 A1 discloses a vacuum handling device for suctioning porous workpieces and also for handling workpieces which are smaller than the gripper field of the surface gripper, i.e. not all gripper modules must abut the workpiece. The gripper modules which do not abut the workpiece can be switched off by a control valve. U.S. Pat. No. 4,252,497 also discloses a surface gripper, with which individual gripper modules can be controlled.

Vacuum handling devices of this type are susceptible to wear and disturbances. This is generally noticeable when the vacuum generator must be switched on more often than usual in order to provide the required vacuum. These disturbances may be caused i.a. by defect or worn gripper modules, leaking lines, leaking line connections, etc. It is very difficult to detect the source of disturbance and it is not possible to make any predictions about the remaining service life of a component.

It is therefore the underlying purpose of the invention to propose a method for operating a vacuum handling device for gripping and lifting objects in a simple, reliable and rapid manner, which avoids unnecessary underpressure and which signals failure of a component at an early stage.

SUMMARY OF THE INVENTION

This object is achieved in accordance with the invention by a method of the above-mentioned type in that, in a first switching state (vacuum on) of the programmable controller, the control valve in the gripper module is closed and the underpressure up to the control valve is detected by a second pressure sensor in the vacuum generator.

In accordance with the inventive method, the vacuum generator and the gripper module are not initially controlled via the machine controller but via a separate programmable controller. This separate programmable controller receives control commands from the machine controller. The separate programmable controller is therefore located between the machine controller and the vacuum generator or the gripper module.

The separate programmable controller has at least two switching states, i.e. provision of a vacuum (vacuum on) as the first switching state, and the command of gripping the object (pick up) as the second switching state. In the first switching state, the vacuum generator provides a vacuum, wherein the control valve in the gripper module is closed. Thus, an underpressure is built up between the vacuum generator and the control valve in the gripper module and is stored in the feed lines.

The vacuum generator has a pressure sensor (second pressure sensor) for measuring the underpressure between the vacuum generator and the control valve. When this vacuum reaches a limit value (fourth limit value) which can, in particular, be adjusted, the vacuum generator is switched off. This fourth limit value is e.g. 750 mbar. A further limit value (third limit value) is stored in the programmable controller, which is e.g. 650 mbar. When the system between the vacuum generator and the control valve leaks, the vacuum provided therein gradually drops. When the vacuum reaches the third limit value, the vacuum generator is automatically switched on again, and the underpressure is increased until the fourth limit value is reached. The switching frequency of the vacuum generator thus monitors the tightness of the vacuum system between the vacuum generator and the control valve.

In accordance with a further embodiment, a fifth limit value is stored in the programmable controller, which is slightly below the third limit value. When the vacuum value is above this fifth limit value, the programmable controller detects that the minimum value for the vacuum has been reached. Regulation between the third and fourth limit value is therefore always effected above the fifth limit value.

The desired vacuum is advantageously applied in the overall system up to the control valve in the gripper module. When the object is gripped, the vacuum line between the vacuum generator and the gripper module must no longer be evacuated. The system therefore provides for vacuum storage. For this reason, the workpiece can be suctioned more quickly.

When the programmable controller receives the command for the second switching state (pick up), the control valve in the gripper module is opened. The gripper module itself is very quickly evacuated, since the space to be evacuated is relatively small. The object is thus suctioned and gripped very quickly. As soon as the desired vacuum in the gripper module has been obtained, the control valve is closed. The first pressure sensor monitors the underpressure in the gripper module, thereby determining the tightness of the gripper module. When the gripper module leaks, e.g. due to a worn sealing lip, the underpressure in the gripper module drops relatively quickly, such that the control valve must be reopened when the underpressure falls below a fourth limit value in order to restore the desired underpressure. The switching frequency of the control valve is monitored by the programmable controller, thereby determining the tightness of the gripper module. It is thereby possible to detect those gripper modules which already show a certain untightness due to wear and will fail in the near future.

The underpressure in the gripper module can be quickly established, since the underpressure provided by the vacuum generator is applied up to the control valve. When this underpressure reaches its lower limit value, the vacuum generator is switched on again, as mentioned above, and the underpressure in the system is raised.

When the gripper module is not applied to the workpiece, no underpressure can be generated, since the gripper module suctions air from the surroundings. This is immediately detected by the pressure sensor, and the control valve of this gripper module is closed to thereby save vacuum.

The programmable controller also monitors switching on and off of the vacuum generator, i.e. its switching frequency, to thereby detect leakage in the system.

The detected data is evaluated in the programmable controller, such that information or news can be called up or output, in particular automatically, e.g. via an in-company Intranet (Ethernet), or in a wireless fashion and/or in the form of an e-mail or an sms.

BRIEF DESCRIPTION OF THE DRAWING

Further advantages, features and details of the invention can be extracted from the following description which describes in more detail a particularly preferred embodiment with reference to the drawing. The features shown in the drawing and/or mentioned in the description and in the claims may thereby be essential to the invention either individually or collectively in arbitrary combination.

DESCRIPTION OF THE PREFERRED EMBODIMENT

Figure 1:
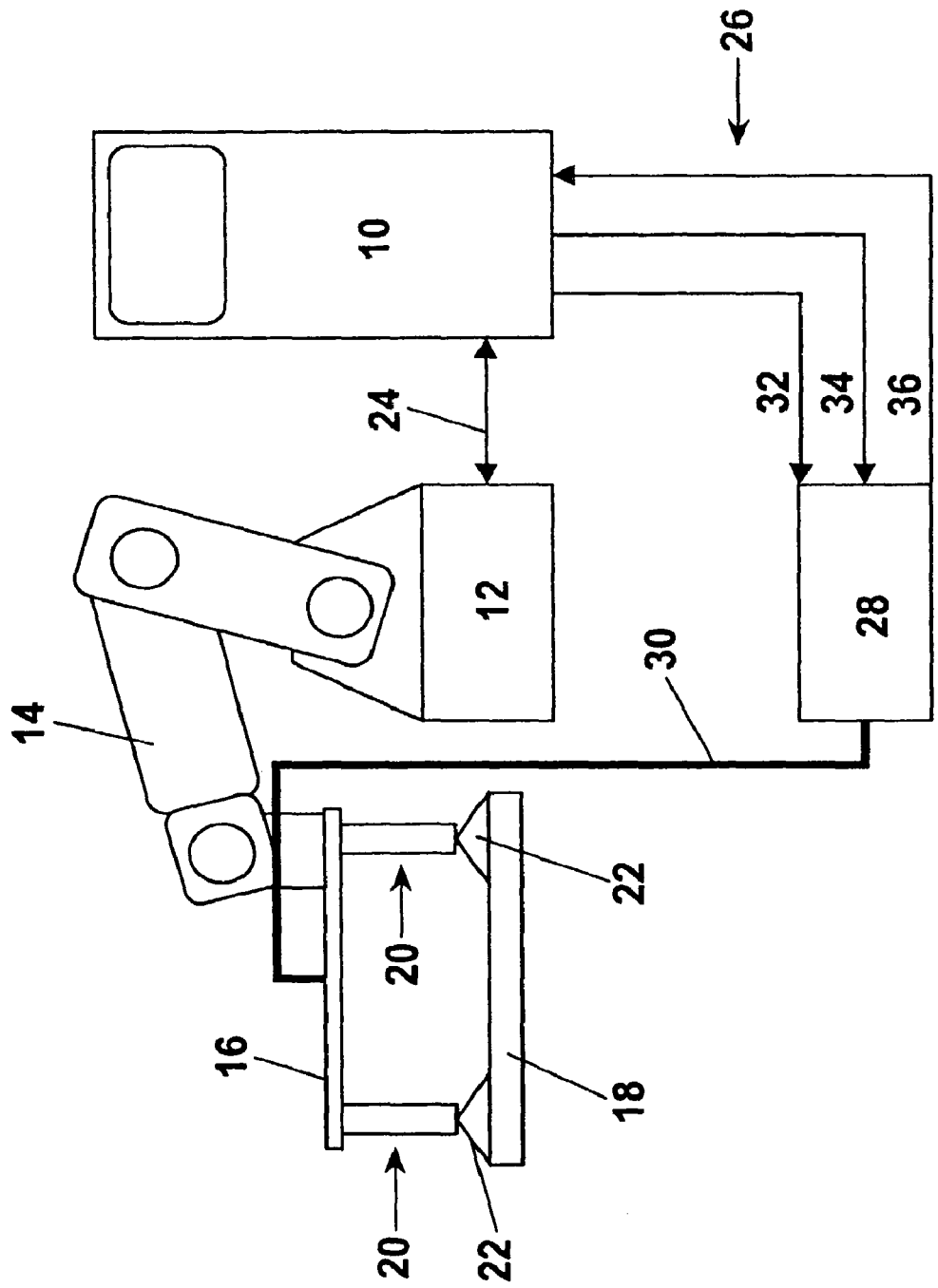
FIG. 1 shows a schematic illustration of a robot with a surface gripper in accordance with prior art.

In FIG. 1, reference numeral 10 designates a machine controller for controlling a robot 12. A surface gripper, designated in total by 16, is flanged to the arm 14 of the robot 12, for gripping and transporting a workpiece 18. The surface gripper 16 has several gripper modules 20 which suction the workpiece 18 with one vacuum gripper 22 each. The machine controller 10 controls the robot 12 directly via a line 24 and controls a vacuum generator 28 via lines 26. The vacuum generator 28 is connected to the surface gripper 16 via a vacuum line 30. The vacuum generator 28 receives a command 32 (pick up) via the lines 26, for suctioning and lifting the workpiece 18, and a command 34 (release) for blowing-off and releasing the workpiece 18. The machine controller 10 moreover receives a command 36 from the vacuum generator 28 for the presence of vacuum. This construction corresponds to prior art, wherein the individual gripper modules 20 cannot be individually controlled.

Figure 2:
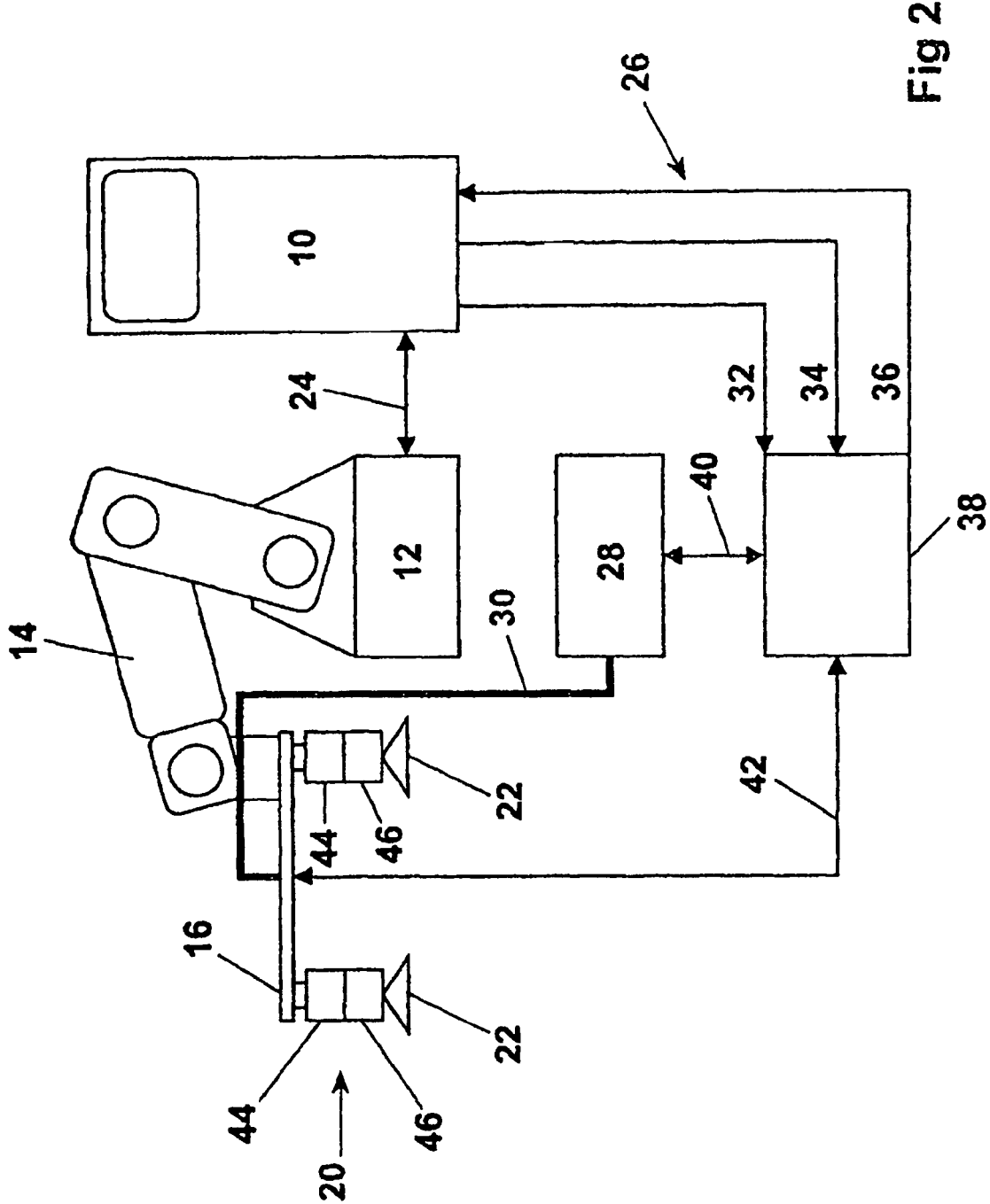
FIG. 2 shows a schematic illustration of a robot with a surface gripper in accordance with the invention.

FIG. 2 shows a construction in accordance with the invention, wherein a separate programmable controller 38 is connected between the vacuum generator 28 and the machine controller 10. The programmable controller 38 and the vacuum generator 28 are linked via a line 40. The programmable controller 38 is moreover coupled to the surface gripper 16 via a field bus 42. FIG. 2 also shows that each gripper module 20 comprises a control valve 44 and a pressure sensor 46. The gripper module 20 can be decoupled from the vacuum line 30 using the control valve 44, wherein the pressure sensor 46 detects the underpressure in the gripper module 20, in particular, in the vacuum gripper 22.

Figure 3:
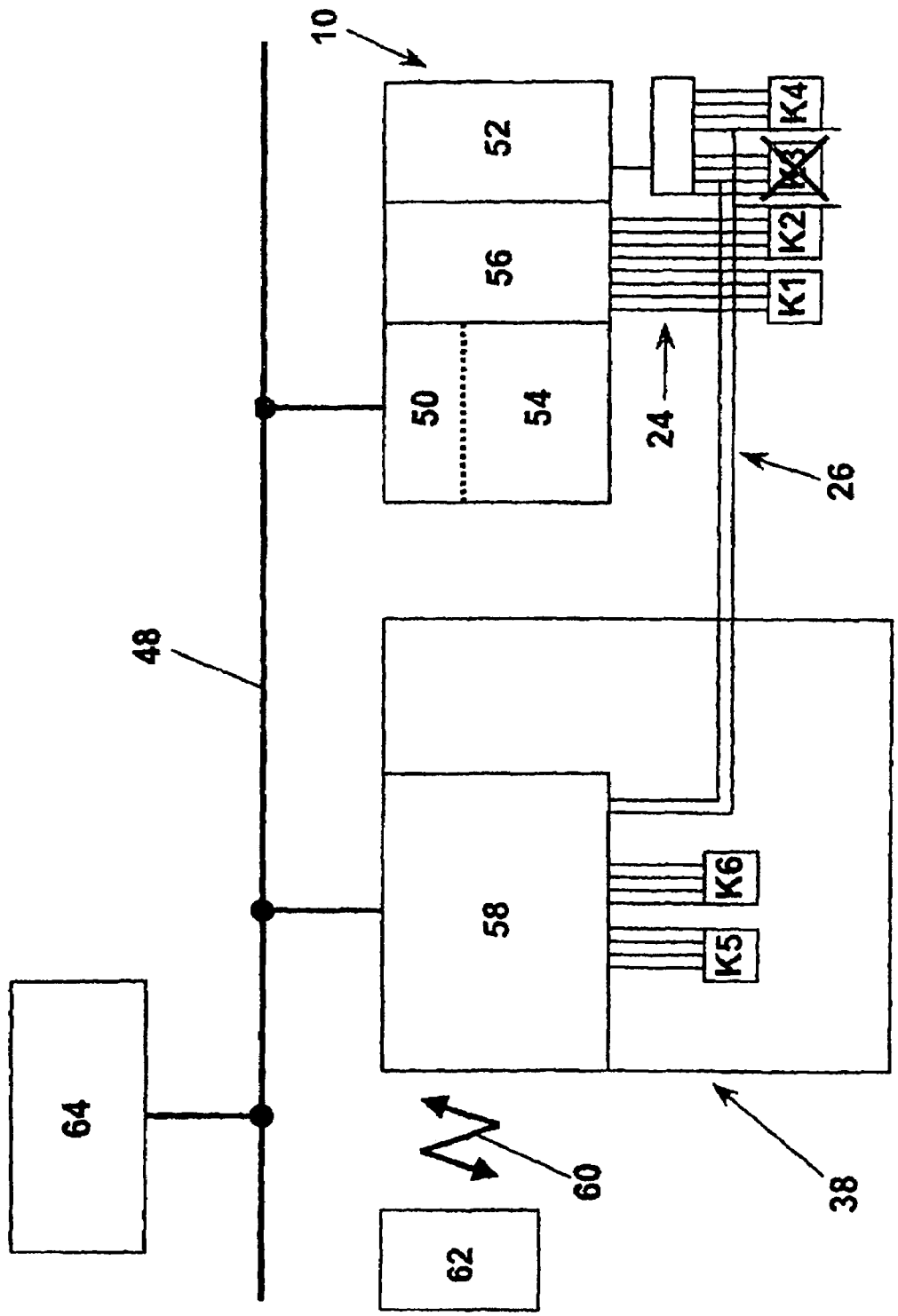
FIG. 3 shows a schematic illustration of the components of the programmable controller.

FIG. 3 is an overview of the components for controlling the surface gripper 16 showing the machine controller 10 and the programmable controller 38 which are both connected to an Intranet line 48. The machine controller 10 has an interface 50 for the Intranet, an interface 52 for the field bus, a robot controller 54 and an interface 56 for issuing and receiving data via the lines 24 and 26. The programmable controller 38 has a switch part 58 that contains the interface for the Intranet. The programmable controller 38 may moreover contain an interface for wireless (reference numeral 60) data transmission to external recording devices 62, e.g. a hand-held computer or the like. Data can be transmitted via the wireless data transmission in the form of an e-mail, an sms etc., and be visualized in the recording device 62. A laptop or PC 64 may moreover be connected to the Intranet line 48.

Figure 4:
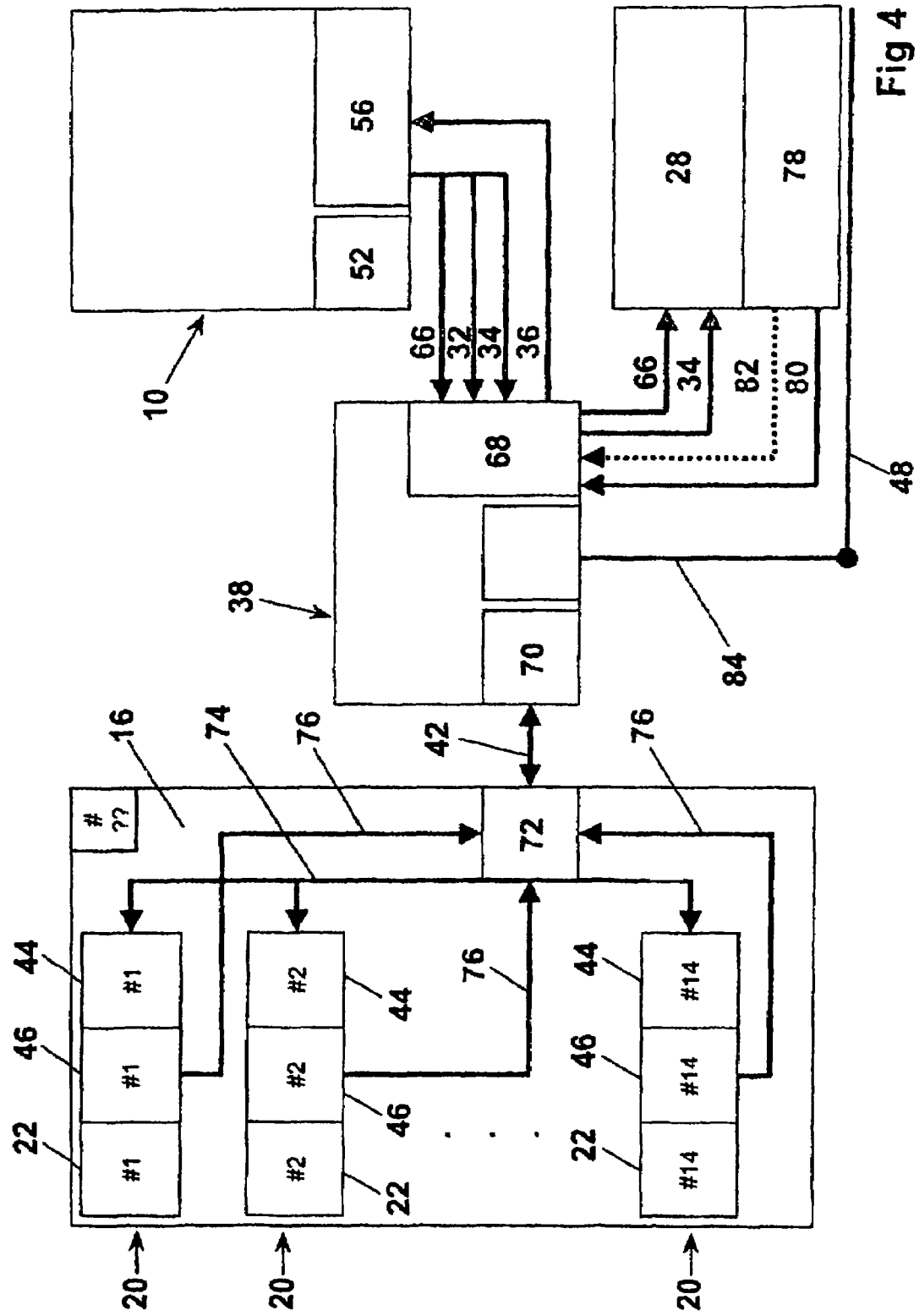
FIG. 4 shows a schematic illustration of the architecture of the controller.

FIG. 4 shows the architecture of the controller. A command 66 for switching on the underpressure (vacuum on) is issued by the machine controller 10 to the programmable controller 38 in addition to the commands 32 and 34. This is usually realized through the standby state of the machine controller 10 or by switching it on. These commands are received (or issued for command 36) by an interface 68 in the programmable controller 38, wherein the field bus 42 is connected to an interface 72 of the surface gripper 16 via an interface 70. Several gripper modules 20 are located in this surface gripper 16, whose control valves 44 are controlled via a line 74. The data detected by the pressure sensors 46 is supplied via lines 76 to the interface 72 and via the field bus 42 to the interface 70 and thereby supplied to the programmable controller 38.

As is mentioned above, the programmable controller 38 controls the vacuum generator 28 by receiving the commands 66 for switching on the underpressure and 34 for switching off the vacuum. The vacuum generator 28 is also provided with a pressure sensor 78 for determining the presence of a vacuum. The limit value of this pressure sensor 78 is e.g. 740 mbar. A signal is emitted via the line 80 to the interface 68 of the programmable controller 38 when this limit value has been reached.

The switching frequency of the vacuum generator 28 is communicated to the programmable controller 38 via a line 82. The tightness of the system between the vacuum generator 28 and the control valve 44 can be determined from this data. The tightness of the individual vacuum grippers 22 can be determined from the switching frequency of the control valves 44 which is passed on via the field bus 42. The programmable controller 38 is connected to the Intranet 48 via a line 84 and can output data relating to the vacuum generator 28 and/or the individual gripper modules 20, when required. Moreover, the parameters of the programmable controller 38 can be adjusted via the line 84.

We claim:

1. A method for operating a vacuum handling device controlled by a programmable controller, the programmable controller being connected to a machine controller, the vacuum handling device having at least one vacuum generator and several gripper modules which are connected to the vacuum generator, each gripper module having a first pressure sensor and a control valve for underpressure in a respective gripper module, wherein each gripper module is connected to the programmable controller, the method comprising the steps of:
   a) closing the control valve in a gripper module in a first vacuum on switching state of the programmable controller; and
   b) detecting an underpressure between the control valve and the vacuum generator using a second pressure sensor in the vacuum generator.

2. The method of claim 1, further comprising opening the control valve in a second pick up switching state of the programmable controller to build up an underpressure in the gripper module until a first limit value has been reached and subsequently closing the control valve.

3. The method of claim 2, wherein the underpressure in the gripper module is monitored by the first pressure sensor.

4. The method of claim 1, wherein the vacuum generator is switched off when the underpressure between the control valve and the vacuum generator, which is detected by the second pressure sensor, exceeds a second limit value or exceeds 750 mbar.

5. The method of claim 1, wherein the vacuum generator is switched on when the underpressure between the control valve and the vacuum generator, which is detected by the second pressure sensor, falls below a third limit value or below 650 mbar.

6. The method of claim 1, wherein the control valve in the gripper module is opened when the underpressure in the gripper module, which is detected by the first pressure sensor, falls below a fourth limit value.

7. The method of claim 1, wherein a signal indicating an insufficient underpressure is output to the programmable controller when the underpressure between the control valve and the vacuum generator, which is detected by the second pressure sensor, falls below a fifth limit value or below 640 mbar.

8. The method of claim 1, wherein switching cycles of the vacuum generator in a first switching state of the programmable controller are monitored and/or evaluated.

9. The method of claim 8, wherein the monitoring and/or evaluation is performed in the programmable controller.

10. The method of claim 9, wherein leakage in and/or wear of the gripper module is monitored using the switching frequency of the control valve of the gripper module.

11. The method of claim 8, wherein leakage in the vacuum system is monitored from the vacuum generator to the control valve using the switching frequency of the vacuum generator.

12. The method of claim 1, wherein switching cycles of the control valve of the gripper module in a second switching state of the programmable controller are monitored and/or evaluated.

13. The method of claim 12, wherein the monitoring and/or evaluation is performed in the programmable controller.

14. The method of claim 13, wherein leakage in the vacuum system is monitored from the vacuum generator to the control valve using the switching frequency of the vacuum generator.

15. The method of claim 12, wherein leakage in and/or wear of the gripper module is monitored using the switching frequency of the control valve of the gripper module.

16. The method of claim 1, wherein data which are calculated or determined by the first and second pressure sensors are output by an interface of the programmable controller to an external location.

17. The method of claim 16, wherein the output is performed automatically.

18. The method of claim 16, wherein the output is performed by e-mail or sms.

19. The method of claim 16, wherein the interface comprises a wire connection or a wire-less connection.

20. The method of claim 16, wherein a function quality of components is communicated through the data.

* * * * *